(12) United States Patent
Trotter, Jr.

(10) Patent No.: US 6,714,354 B2
(45) Date of Patent: Mar. 30, 2004

(54) GRIN LENSES, DEVICES AND METHODS OF MANUFACTURE

(75) Inventor: Donald M. Trotter, Jr., Newfield, NY (US)

(73) Assignee: Corning Incorporated, Corning, NY (US)

(*) Notice: Subject to any disclaimer, the term of this patent is extended or adjusted under 35 U.S.C. 154(b) by 6 days.

(21) Appl. No.: 10/219,031

(22) Filed: Aug. 14, 2002

(65) Prior Publication Data

US 2004/0032669 A1 Feb. 19, 2004

(51) Int. Cl.$^7$ ................................................ G02B 3/00
(52) U.S. Cl. .................. 359/652; 359/653; 359/654; 359/376
(58) Field of Search ......................... 359/652–654, 359/362–398

(56) References Cited

U.S. PATENT DOCUMENTS

| | | | |
|---|---|---|---|
| 3,655,259 A | * | 4/1972 | Miyauchi et al. ........... 359/376 |
| 4,674,843 A | | 6/1987 | Baba et al. |
| 5,870,229 A | | 2/1999 | Tsuchida |
| 6,088,166 A | | 7/2000 | Lee |
| 2003/0117715 A1 | * | 6/2003 | Schnitzer .................... 359/652 |

OTHER PUBLICATIONS

NSG America, Inc.; "Grin and SELFOC" 1 page; http://www.nsgamerica.com/grin_selfoc.shtml.

* cited by examiner

Primary Examiner—Scott J. Sugarman
Assistant Examiner—M. Hasan
(74) Attorney, Agent, or Firm—Timothy M. Schaeberle

(57) ABSTRACT

Graded index lenses, methods, and devices are disclosed. In certain embodiments, he lenses are made from generally cylindrical glass members having a radially varying refractive index and have a pitch less than about 0.23. Other embodiments relate to graded index lenses having a pitch between about 0.23 and 0.25 and an index gradient less than or equal to 0.3.

23 Claims, 14 Drawing Sheets

GRIN LENSES, DEVICES AND METHODS OF MANUFACTURE

FIELD OF THE INVENTION

This invention relates to gradient index (GRIN) lenses, devices including GRIN lenses and methods for making GRIN lenses.

BACKGROUND OF THE INVENTION

GRIN lenses are widely used in optical devices and telecommunications applications such as switches, circulators, isolators, and wavelength division multiplexers. GRIN lenses typically utilize a glass rod having a sufficient diameter such that the index of refraction of the GRIN lens can be gradually varied from the axis of the lens towards the outer periphery of the rod.

The trend toward miniaturization of photonic devices has led several manufacturers to offer gradient index (GRIN) lenses with diameters smaller than the industry standard 1.8 mm. Many manufacturers make these smaller diameter lenses by simply starting with smaller-diameter cane, and using an ion exchange process similar to that used for the larger diameter products. This results in the core refractive index, $n_o$, and the surface refractive, $n_r$, index being essentially the same as in the larger diameter lenses, so that the gradient parameter, $$\sqrt{A}, \left( = \frac{1}{r} \cdot \sqrt{2 \cdot \left(1 - \frac{n_r}{n_o}\right)} \right)$$

is larger for the smaller diameter lenses, where r is the radius of the lens. Since the lens properties (focal length, beam diameter, etc.) depend strongly on the value of $\sqrt{A}$, the performance of the smaller lenses differs markedly from that of the standard 1.8 mm lenses. In particular, the beam diameter (also known as spot size) is smaller for lenses having larger values of $\sqrt{A}$. This is undesirable for many applications since the smaller beam diverges more rapidly, has different misalignment sensitivities, and will adversely affect the performance of narrow-band Wavelength Division Multiplexing (WDM) filters.

One way to avoid this problem is to make a standard 1.8 mm lens, then perform a grinding and polishing operation to reduce the outside diameter of the lens. This produces a smaller diameter lens having the same $\sqrt{A}$ value as the standard lens. However, it is undesirable on two counts: it adds a costly grinding step to the manufacturing operation; and it wastes glass by producing fewer lenses for each pound of glass melted and formed into cane. Another potential means to produce small diameter lenses producing beam diameters comparable with the standard diameter lenses would be to alter the glass composition, so that changes in $n_r$ and $n_o$ compensate for the change in r to produce the same value of $\sqrt{A}$. However, this is undesirable from a manufacturing standpoint, in that it requires different glasses to be produced for lenses of different properties, which adds complexity to the manufacturing process. It is preferable that a single glass could be used for a multitude of different lens products. While it would be possible to utilize a single glass by prolonging the ion exchange step or heat treatment step in lens manufacture to flatten the gradient, thereby reducing $\sqrt{A}$ for the smaller lenses, this is also undesirable from a manufacturing standpoint, since it lengthens the manufacturing time, thereby reducing throughput.

Although there is a particular interest in small diameter lenses having a diameter less than about 1.8 mm, many photonic devices, such as MEMs switches, require longer optical path distances than are provided with small diameter lenses. It would be desirable to provide a lens having a larger beam, hence a longer optical path distance, with a lens having the standard 1.8 mm diameter, since this would allow use of standard packaging and fixtures.

SUMMARY

Certain embodiments of the invention relate to graded index lenses having a pitch less than 0.23. Other embodiments relate to devices including such GRIN lenses, such as collimators. Still other embodiments relate to methods of making GRIN lenses having a pitch less than 0.23. Other embodiments relate to lens having pitch of about 0.23–0.25. It is to be understood that both the foregoing general description and the following detailed description are exemplary and are intended to provide further explanation of the invention as claimed.

DETAILED DESCRIPTION

Figure 1:
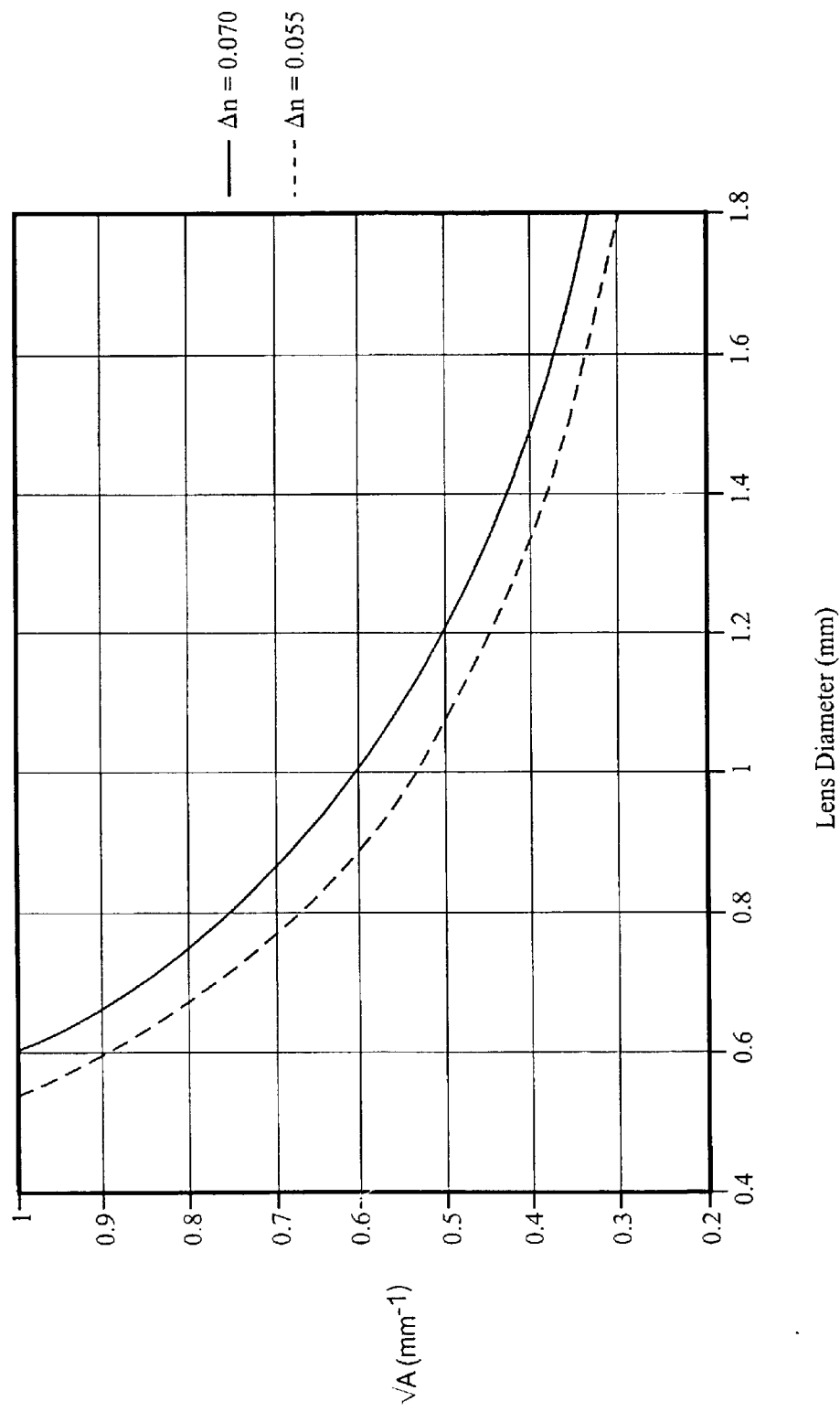
FIG. 1 is a graph showing the dependence of the index gradient of a graded index lens on lens diameter.

Before describing several exemplary embodiments of the invention, it is to be understood that the invention is not limited to the details of construction or process steps set forth in the following description. The invention is capable of other embodiments and of being practiced or carried out in various ways.

In overview, certain embodiments of the present invention pertain to a graded index lens comprising a generally cylindrical glass member having a radially varying index of refraction, the glass member having a length such that the lens has a pitch of less than about 0.23. As used herein, the pitch length of the lens, $L_o$, is $2\pi/\sqrt{A}$; the fractional pitch, or, hereafter, pitch, is $L/L_o = L\sqrt{A}/2\pi$, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about 1 mm, for example, 0.8 mm. In certain embodiments, lenses having a diameter less than about 1 mm are operative to produce a beam having a mode field diameter between about 350 microns and 450 microns when illuminated with a beam having a mode field diameter of about 10.4 microns.

Other embodiments of the invention relate to conventional lenses having larger diameters between about 1.5 mm and 2 mm. For example, lenses having larger diameters between about 1.5 and 2 mm are operative to produce a beam having a mode field diameter exceeding about 500 microns when illuminated with a beam having a mode field diameter of about 10.4 microns.

Other embodiments of the invention relate to optical devices including lenses of the various embodiments. Such optical devices include, but are not limited to fiber optic collimators that include a fiber and a GRIN lens in a spaced apart relationship. The GRIN lenses can be used in a wide variety of devices, including DWDM's, OADM's, isolators, circulators, hybrid optical devices, optical attenuators, MEMs devices, and optical switches.

In one specific embodiment, a collimator is provided including an optical fiber and a generally cylindrical radial gradient index lens in a spaced apart relationship, wherein the lens has a pitch less than about 0.23. In a more specific embodiment, for a lens having a diameter of about 1.8 mm, a core refractive of about 1.535, a pitch greater than about 0.10 and an index gradient of about 0.295 mm$^{-1}$, the working distance between the lens and the fiber is less than about 4 mm. In another specific embodiment, for a lens having a diameter less than about 1 mm, the working distance between the lens and the fiber is less than about 2.5 mm. In yet another specific embodiment, for a lens having a diameter less than about 0.8 mm, the working distance between the lens and the fiber is less than about 2.0 mm. In yet another embodiment, for a lens of diameter between about 1.5 and 2.0 mm, the $\sqrt{A}$ is between about 0.1 and 0.3 mm$^{-1}$.

Other embodiments of the invention relate to methods of making a graded index lens. Certain method embodiments include obtaining a generally cylindrical glass member having a radially varying index of refraction and forming the glass member having a length such that the lens has a pitch of less than about 0.23. According to certain embodiments, the pitch of the lens is between 0.23 and 0.08. In certain other embodiments, GRIN lenses have pitch between about 0.23 and 0.25.

Graded index lenses are generally cylindrical glass bodies or members having an index of refraction that is highest at the central axis of the body. The refractive index decreases with radial distance from the central axis to a minimum value at the outer surface or circumference of the lens. The gradient constant of the lens, $\sqrt{A}$, is defined by the equation $$\sqrt{A} = \frac{1}{r} \cdot \sqrt{2 \cdot \left(1 - \frac{n_r}{n_o}\right)},$$

where $n_o$ represents the core refractive index, $n_r$ represents the refractive index at the peripheral surface of the glass, and r is the radius of the member. Such lenses are made by well known ion exchange processes and are available commercially from NSG America Inc. and Corning, Inc.

The relationship of diameter versus $\sqrt{A}$ is shown in FIG. 1 for a lens made from a glass with $n_o$ at 1550 nm of about 1.535. The solid line in the graph represents a lens having a theoretical $\Delta n$ of about 0.070, and the dashed line in the graph represents a lens having an actual value of $\Delta n$ of about 0.055 due to ion exchange or post heat treatment causing the presence of the index-reducing ion in the central portion of the lens.

Figure 2:
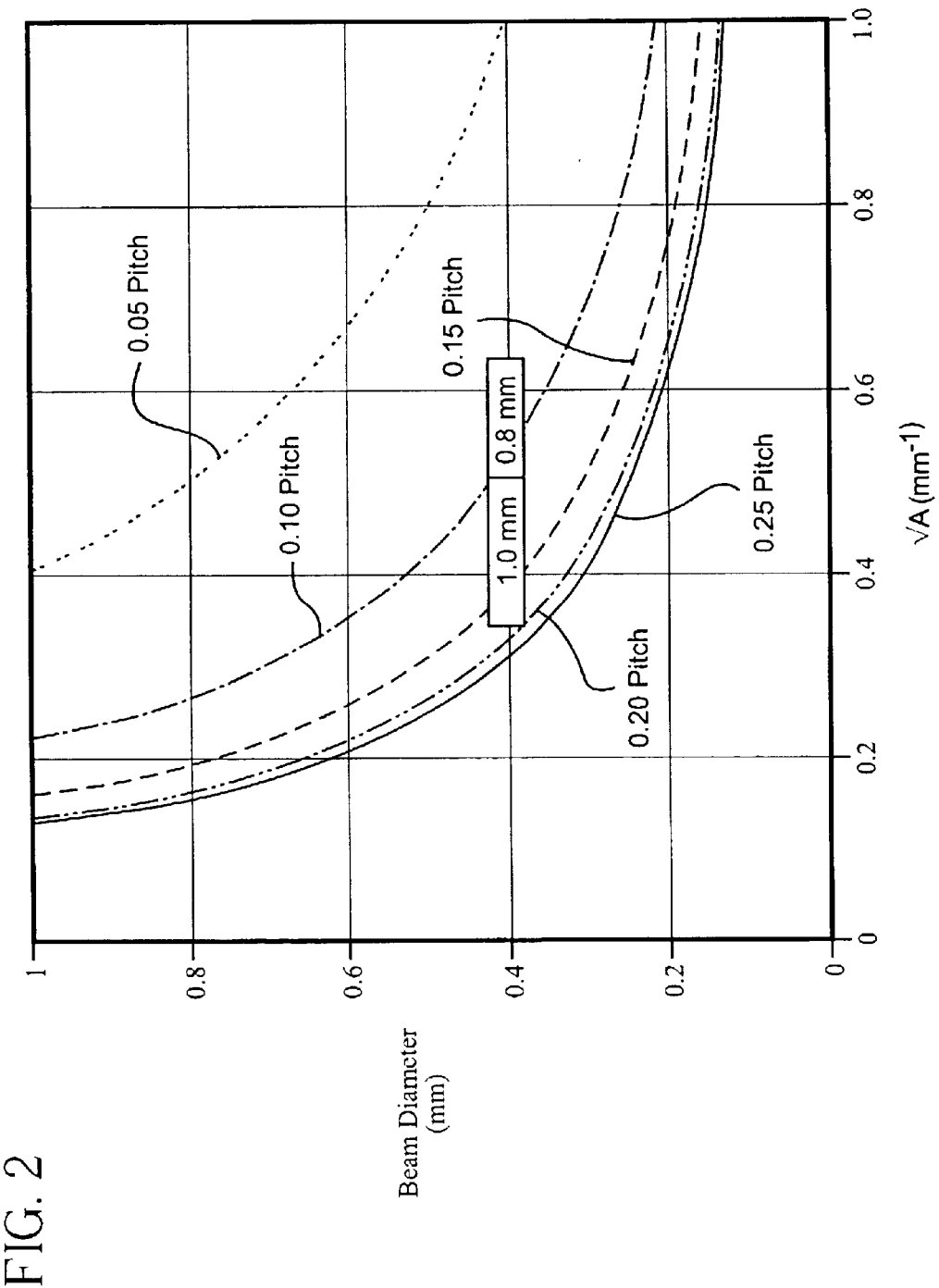
FIG. 2 is a graph showing beam diameters for various pitch GRIN lenses as a function of index gradient.

When GRIN lenses are used with single mode fibers having a mode field diameter between about 9 microns and 11 microns, and typically about 10.4 microns, to collimate or transfer optical signals, they produce a beam with a characteristic diameter. To ensure capture of all of the optical power without loss, the lens diameter should be approximately twice the diameter of the beam being transmitted. FIG. 2 is a graph showing beam diameters for lenses of various pitches having $n_o$=1.535 as a function of $\sqrt{A}$. The boxed areas in FIG. 2 show the useful parameters for lenses having diameters of 1.0 mm and 0.8 mm. As shown by the boxed areas, 1 mm lenses producing about a 400 mm beam diameter can be made between about 0.25 pitch and 0.12 pitch. Lenses having a diameter of 0.8 mm producing a beam diameter of about 0.4 mm (beam diameter is listed as 400 mm and the chart shows it as 0.4 mm . . . inconsistency that needs to be corrected??] can be made which exhibit a pitch between about 0.25 and 0.08. The most favorable condition would be the smallest pitch lenses which would be shortest, thus producing more lenses per rod of glass manufactured. However, as will be seen below, the requirement that the lens diameter be about twice the input beam diameter precludes use of the very smallest pitch lenses.

Figure 3:
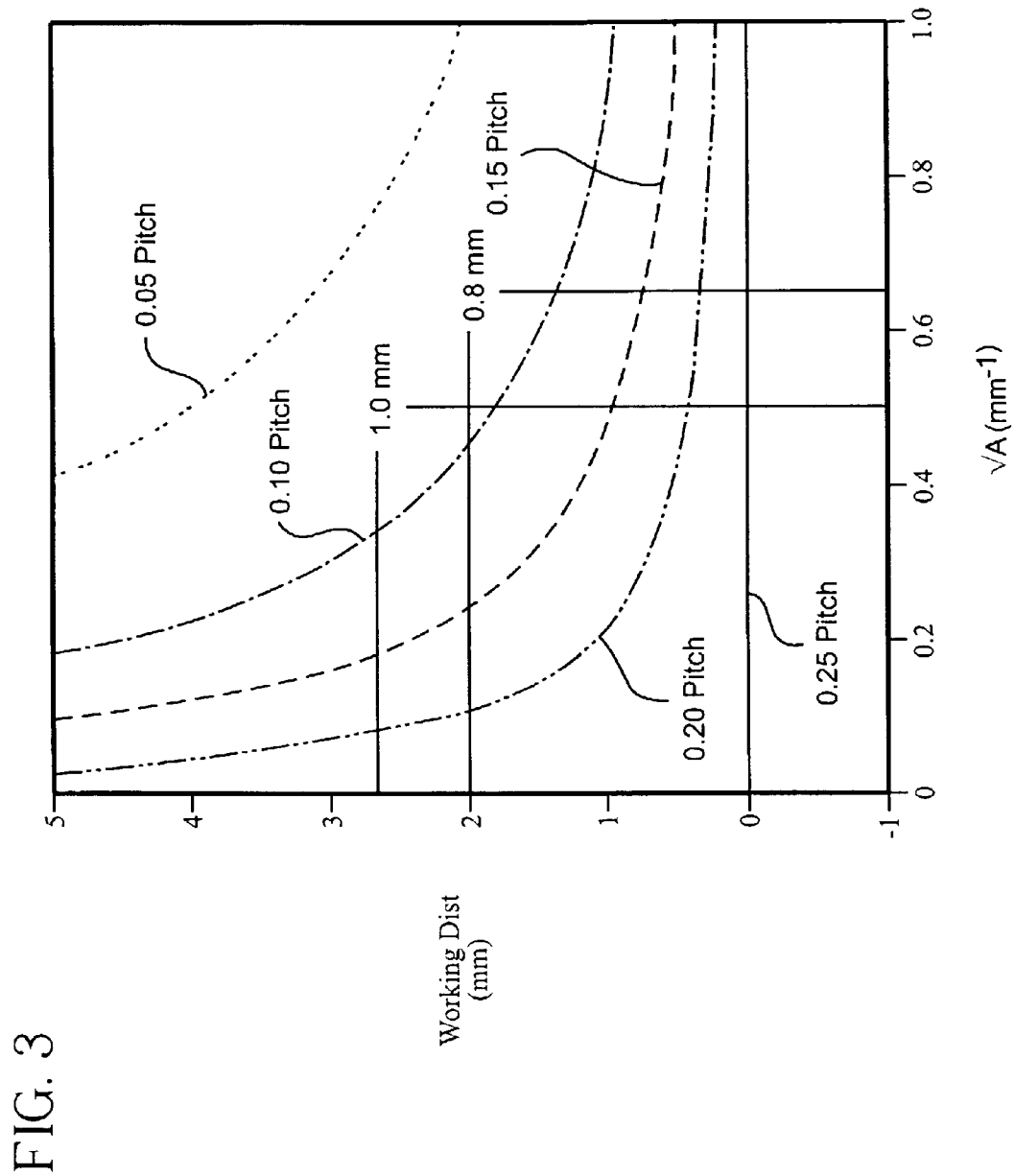
FIG. 3 is a graph showing working distance versus index gradient for GRIN lenses of various pitches.
Figure 4:
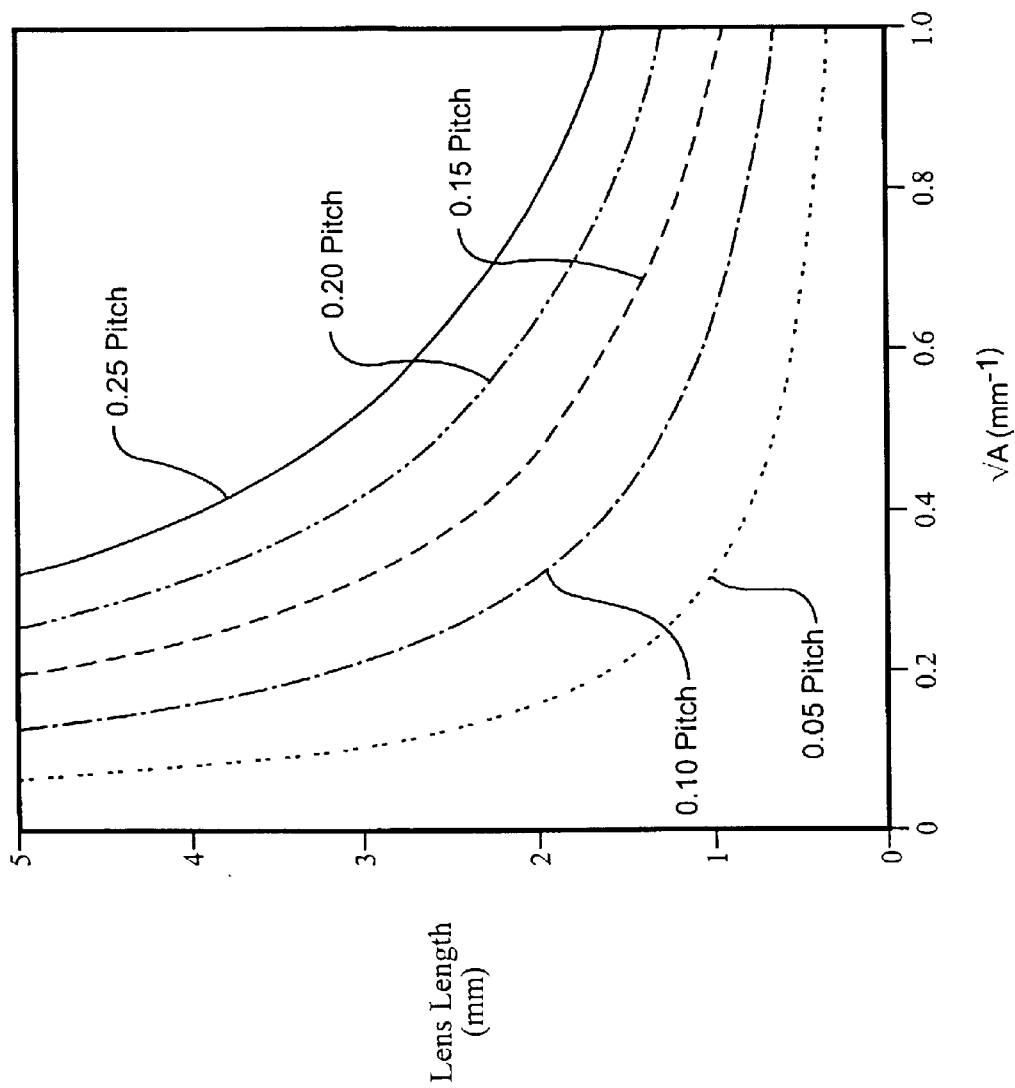
FIG. 4 is a graph showing lens length versus index gradient for GRIN lenses of various pitches.
Figure 5:
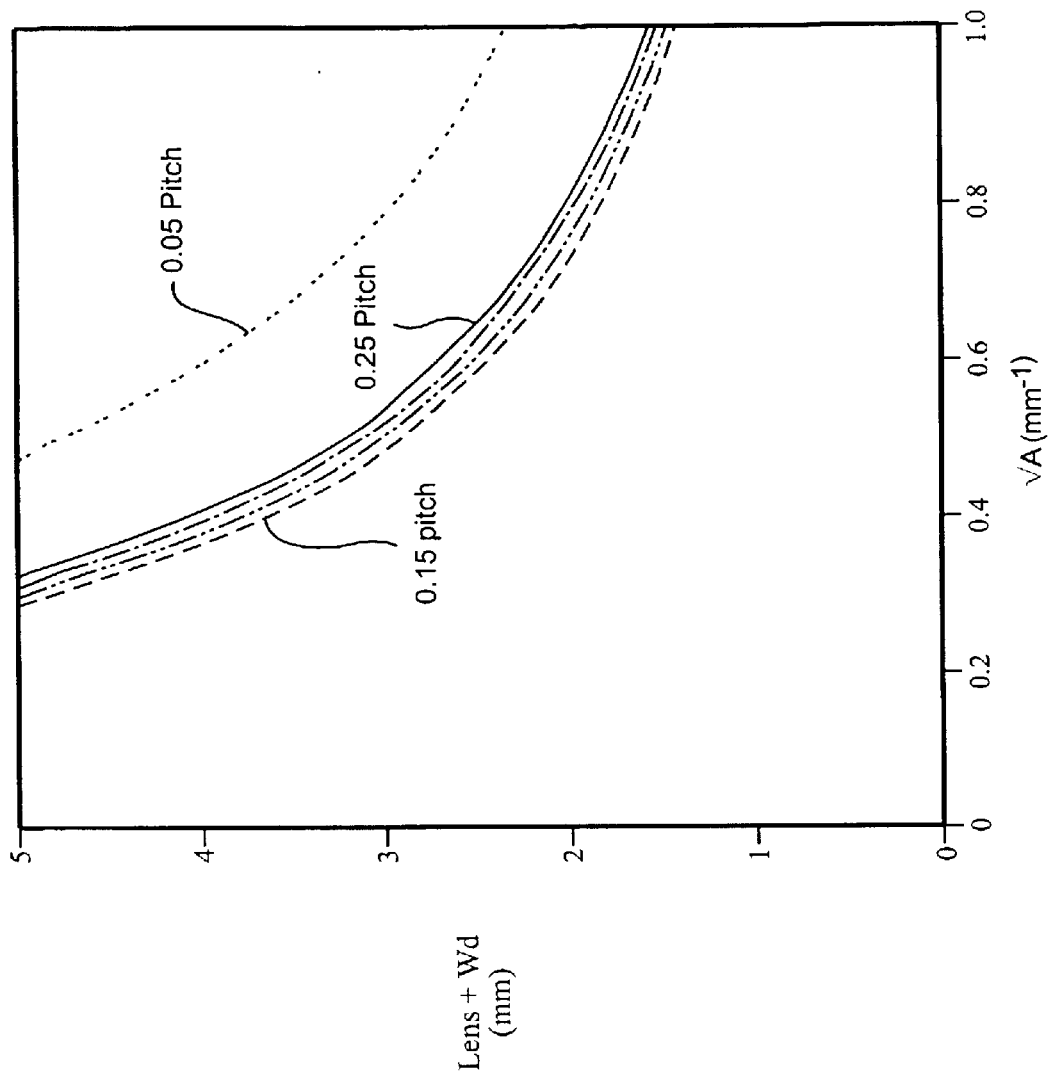
FIG. 5 is a graph showing the sum of working distance and lens length versus index gradient for GRIN lenses of various pitches.

In addition, for small diameter lenses, reducing the pitch of the lens will increase the working distance, as shown in FIG. 3. The boxed areas of FIG. 3 illustrate the working distance versus gradient index for 1.0 mm and 0.8 mm diameter lenses. As used herein, the working distance of a lens is the distance between the surface of the lens and its focal point. However, the lens length is also reduced as the pitch is reduced, as shown in FIG. 4. As shown in FIG. 5, however, the overall component length, which is the sum of the working distance plus lens length, is essentially constant, except for very small pitch lenses.

Figure 6:
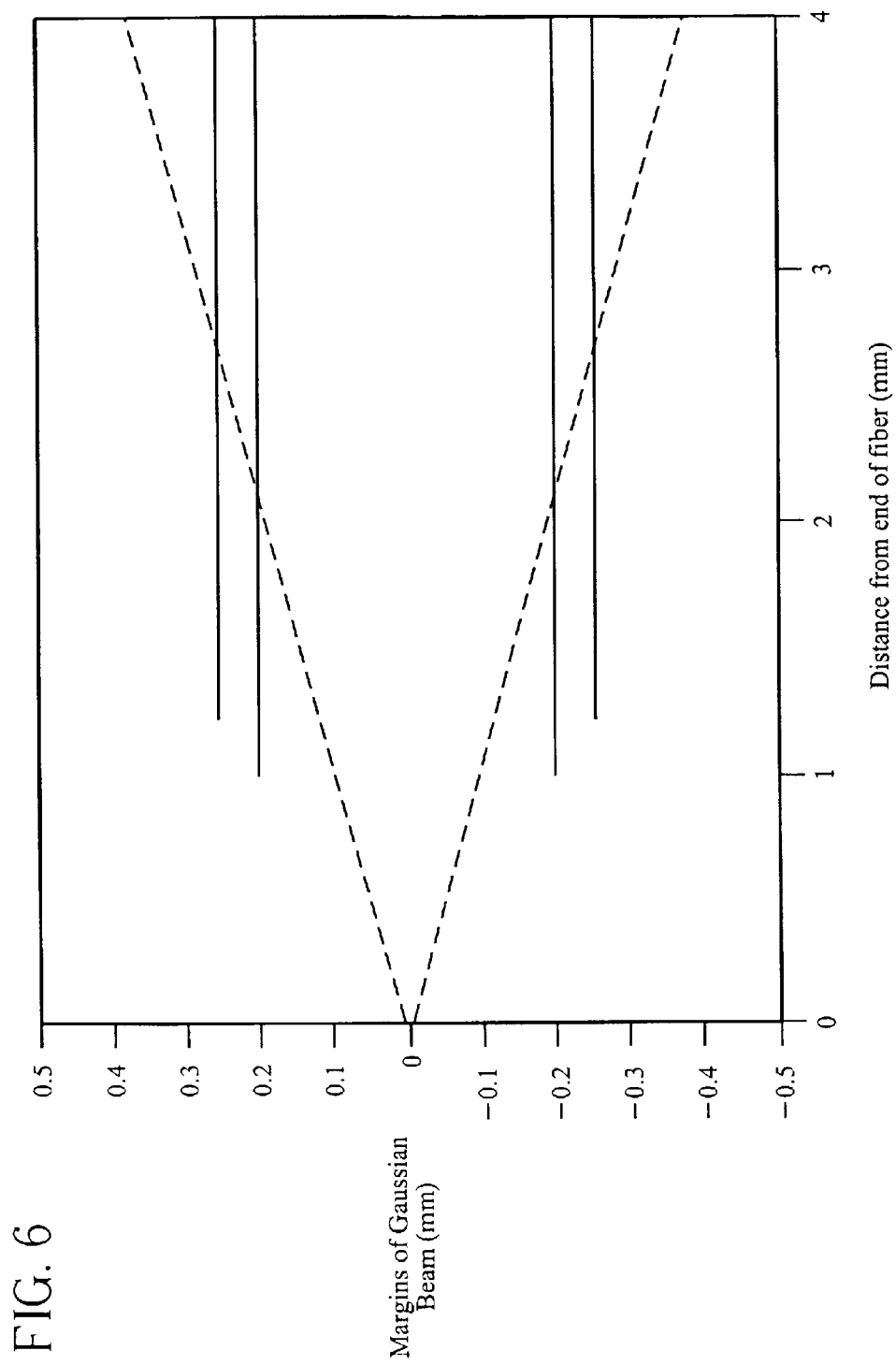
FIG. 6 is graph showing the margins of a Gaussian beam versus the distance from the end of an optical fiber.

One factor that must be kept in mind when manufacturing a lens is that as the distance between the fiber and lens increases, the spot size incident on the lens from the fiber increases. As mentioned above, this spot size generally should be smaller than about one-half of the lens diameter for all of the light to be captured. FIG. 6 shows the margins of a 10.4 micron diameter light beam typically emitted by a single mode optical fiber at 1550 nm as the beam propagates away from the end of the fiber. To ensure that all of the light is captured, the fiber should be no farther than about 2 mm from the end of a 0.8 mm lens, and about 2.5 mm from a 1 mm lens. This limits the lens design to the boxed region in FIG. 3, or to lenses greater than about 0.10 pitch.

Figure 7:
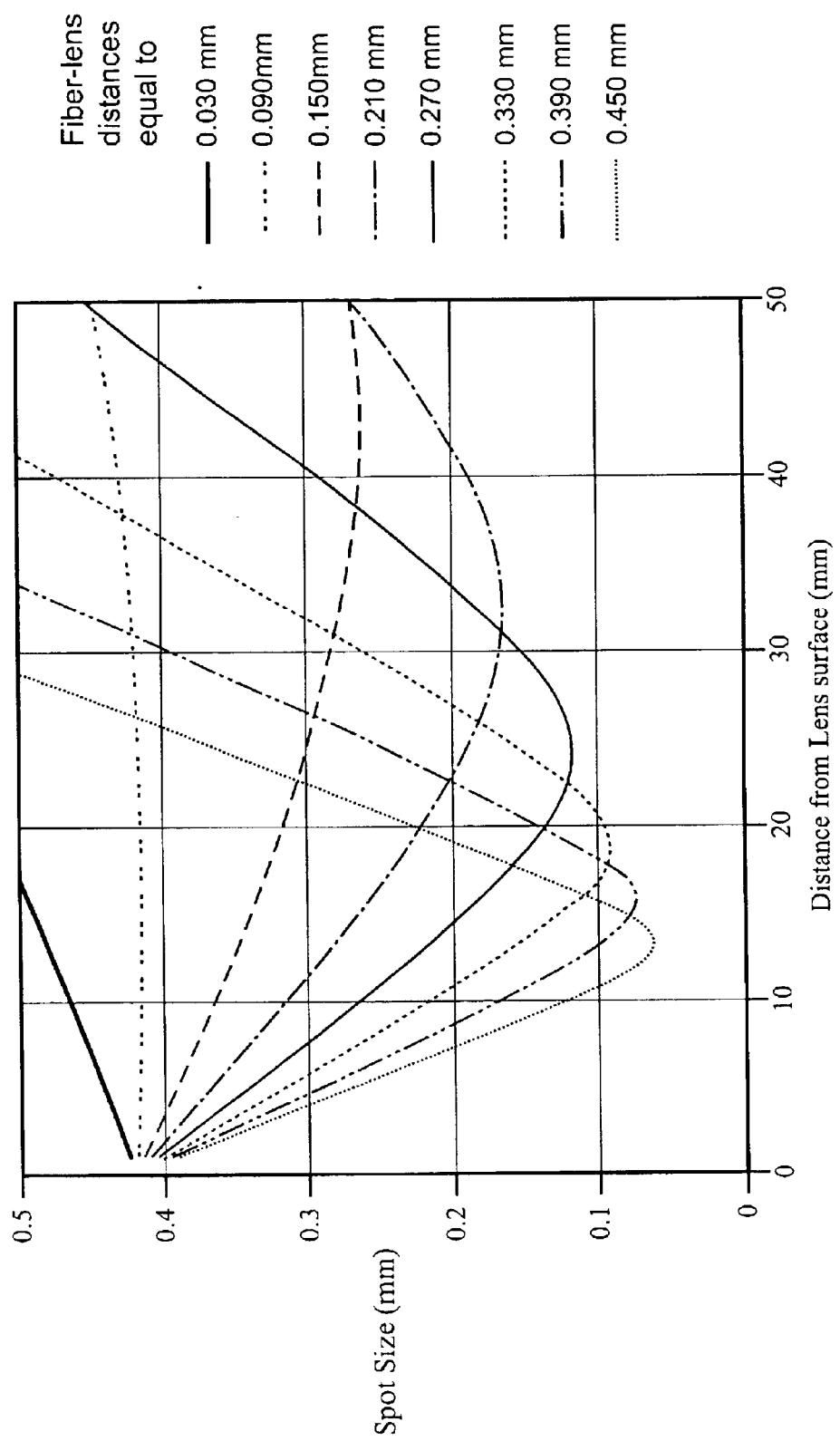
FIG. 7 is a graph of spot size of a Gaussian beam exiting a conventional GRIN lens having a pitch of about 0.25 versus the distance from the lens surface.
Figure 8:
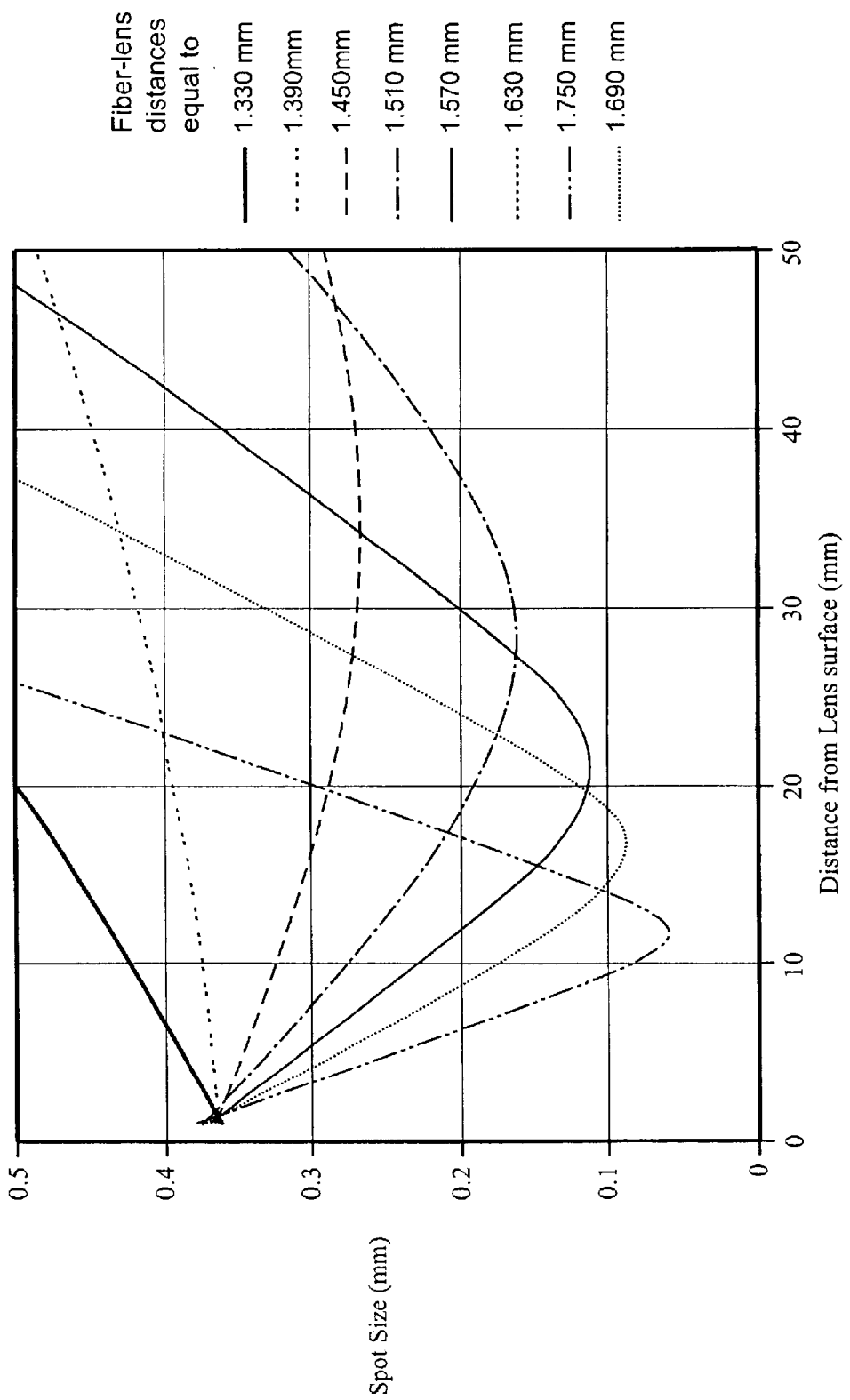
FIG. 8 is a graph of spot size of a Gaussian beam exiting a GRIN lens having a pitch of about 0.12 versus the distance from the lens surface.

FIGS. 7 and 8 show beam profiles for two different lenses for several fiber to lens distances in the vicinity of their working distances at 1550 nm. FIG. 7 shows beam profiles for a lens with $\sqrt{A}$ equal to about 0.295 and a pitch of 0.244, when the beam entering the lens is a Gaussian beam having a mode field diameter of 10.4 microns located various distances from the input surface of the lens. FIG. 8 shows beam profiles for a lens with $\sqrt{A}$ equal to about 0.500 and a pitch equal to about 0.119, when the beam entering the lens is a Gaussian beam having a mode field diameter of 10.4 microns located various distances from the input surface of the lens. The beam profiles for both cases are essentially the same as a function of displacement from the working distance. Thus, reducing the diameter of the lens made from a glass used to make conventional 1.80 mm diameter lenses using a standard ion exchange process raises the $\sqrt{A}$ value of the lens, which decreases the beam diameter. However, reducing the pitch of the lens to produce the same beam diameter as a 1.8 mm lens allows the same glass to be used for the smaller diameter lenses and results in a larger number of lenses per ion-exchanged rod produced; i.e., an increased yield.

In another embodiment of the invention, the pitch of conventional GRIN lenses, i.e., lenses having a diameter between about 1.5 mm and 2 mm, and more typically about 1.8 mm, can be reduced to make lenses which produce beams which spread more slowly with distance away from the lens. Slowing the spread of the beam increases the useful separation at which devices utilizing the lenses can be used without excess loss. Thus, conventional GRIN lenses having a reduced pitch of between about 0.23 and 0.10 are operative to produce beam diameters (Gaussian mode field diameters) in excess of 500 microns when illuminated with a Gaussian beam having a mode field diameter of between about 9 and 11 microns and more typically about 10.4 microns (typical of single mode optical fiber) having its waist near the focal point of the lens. The larger beam diameter provides a longer useful separation for the lenses, which allows them to be used in longer path length devices such as micro-electromechanical (MEMs) switches. The same glass and ion exchange process may be used for many products, with the beam diameter being adjusted for various applications by varying the pitch as a result cutting the lenses to different lengths. Since the lenses are physically shorter than conventional lenses having pitches exceeding 0.23, more lenses may be made for each quantity of glass produced and formed into rods.

Figure 9:
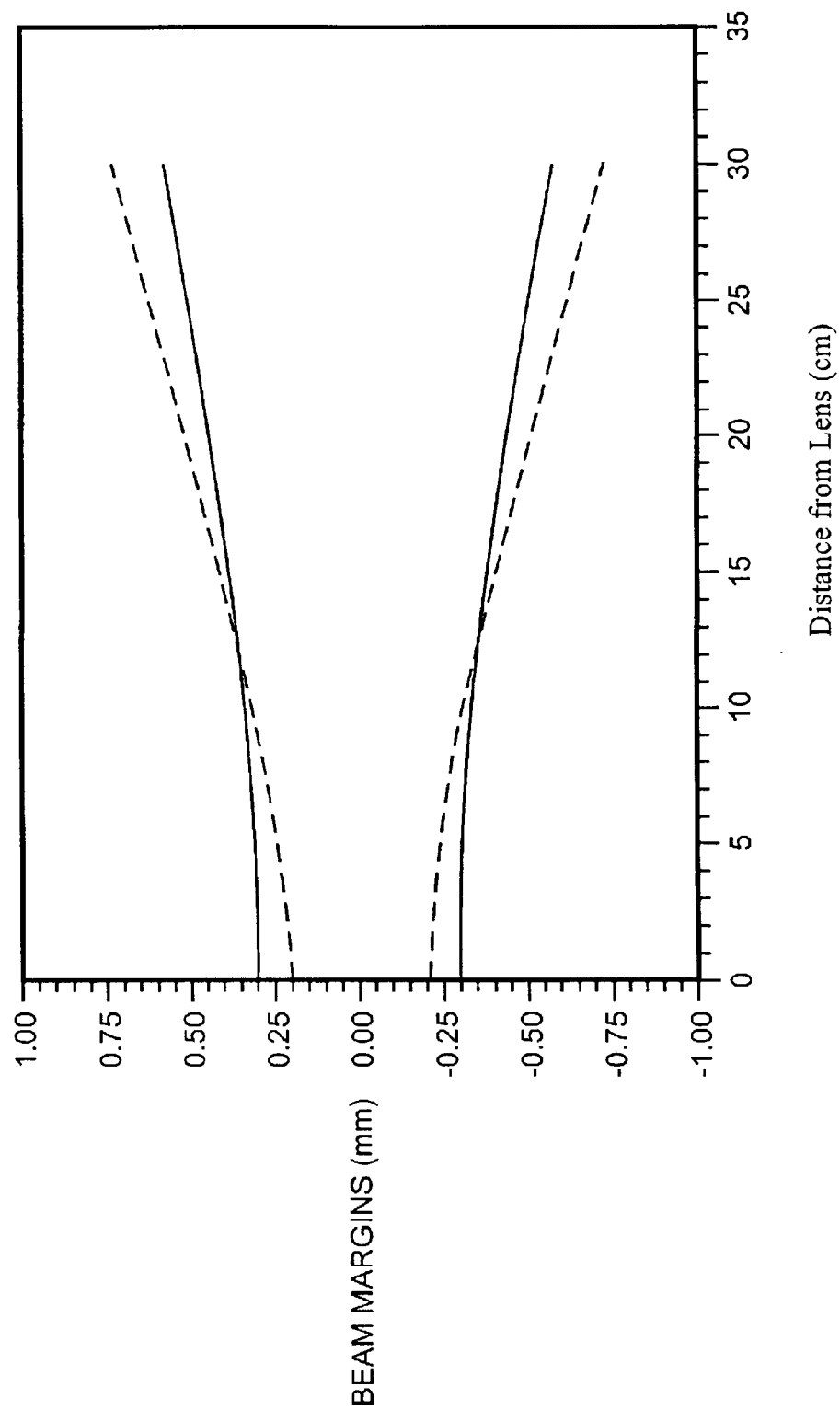
FIG. 9 is a graph showing the margins of the Gaussian beam produced by lenses having pitches of 0.23 and 0.125.

Referring to FIG. 9, the margins of the Gaussian beam produced by placing the 10.4 $\mu$m beam waist exiting a single mode fiber at the focal points of two lenses are shown. One set of curves represents the beam produced by a 0.23 pitch lens, as represented by the dotted line, with $n_o$=1.535 and $\sqrt{A}$=0.295. The other set of curves are produced by a similar lens with 0.125 pitch, as represented by the solid line. The end of the lens is on the left-hand side of FIG. 9. The 0.125-pitch lens produces an initially larger beam, but this spreads more slowly as it propagates away from the lens, and ultimately is substantially smaller then the beam produced by the 0.23-pitch lens. This results in a longer distance over which the beam can be captured by a similar lens without substantial loss, providing a larger useful separation distance between lenses.

Figure 13:
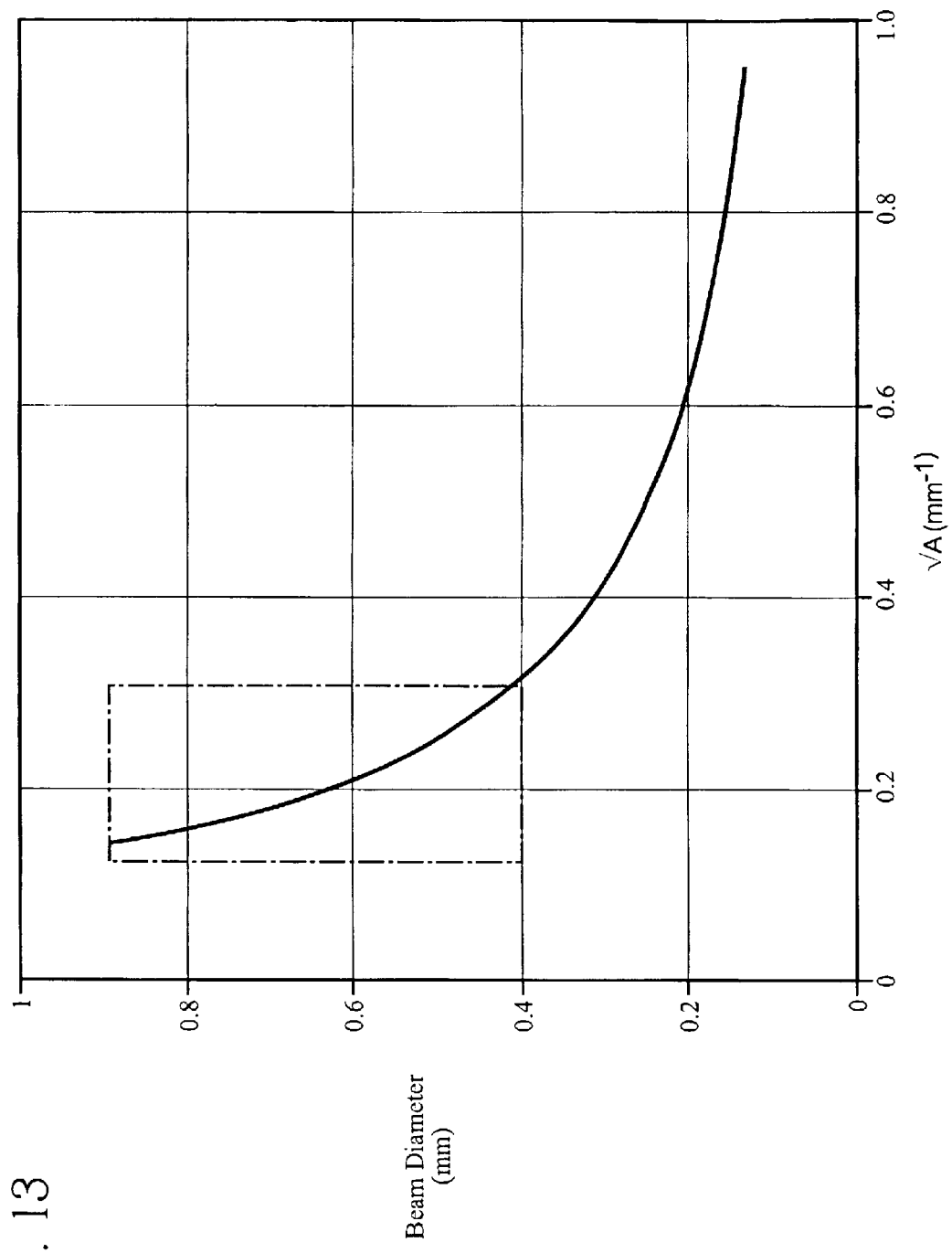
FIG. 13 is a graph showing beam diameters for 0.23–0.25 pitch GRIN lenses as a function of index gradient.
Figure 14:
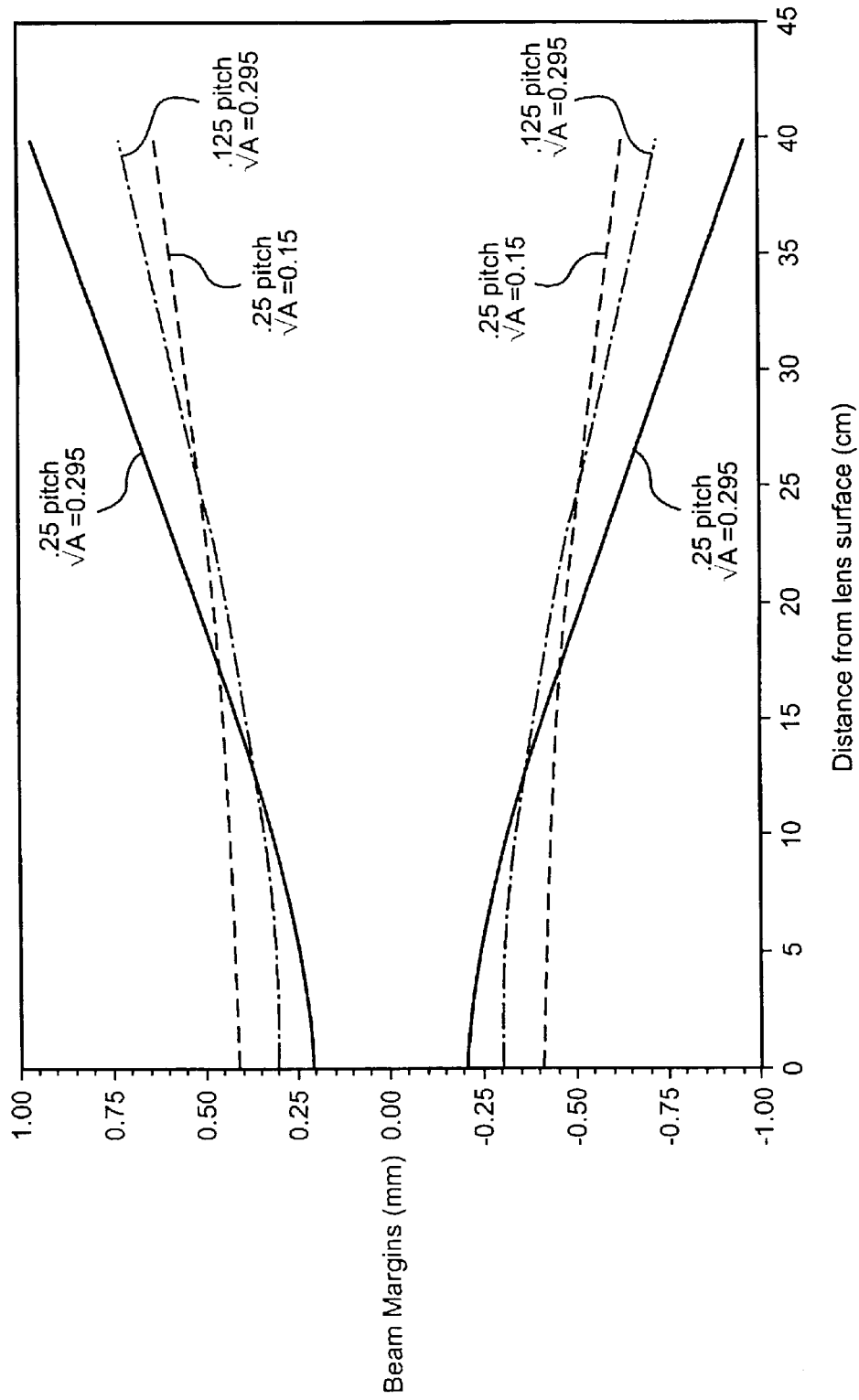
FIG. 14 is a graph showing the beam margins for a Gaussian beam output from a lens of 0.25 pitch.

If even larger useful separations are required, lenses of the standard 1.8 mm diameter having pitches between 0.23 and 0.25 but with reduced values of $\sqrt{A}$ may be employed. Such lenses may be produced by altering the ion exchange and heat treatment of standard lenses to increase the amount of index-reducing ion or ions migrating to the center of the lens. This is less convenient from a manufacturing standpoint than reducing pitch, since it requires a prolonged manufacturing step or steps, but may be desirable to produce lenses providing longer useful optical separations. Since the focal point of such lenses is at or near the input surface of the lens, no considerations of the effect of working distance on input beam diameter need be made. In FIG. 13, the boxed area shows the region in which the output beam (spot size) of a 1.8 mm lens with 0.23–0.25 pitch still meets the criterion that the beam diameter is less than about ½ of the lens diameter. This range is $\sqrt{A}$ about 0.10 to 0.30 $mm^{-1}$. Referring now to FIG. 14, lenses in this range will exhibit improved useful separations over lenses having larger values of $\sqrt{A}$. FIG. 14 shows the output margins of beams resulting from an input 10.4 micron Gaussian beam at the focal point of the lens are shown for two 0.25 pitch lenses having $\sqrt{A}$ values of 0.295 and 0.15 $mm^{-1}$. Although the beam from the lens with the lower value of $\sqrt{A}$ is initially larger, it spreads more slowly, and thus provides a larger useful optical separation. Also note that the diameter of this beam where it exits the lens is approximately 0.85 mm, so it is still slightly less than ½ the lens diameter. Also shown for comparison in FIG. 14 is the beam from a reduced pitch lens of 0.125 pitch with $\sqrt{A}$ equal to 0.295 $mm^{-1}$. Although the useful optical separation of this lens exceeds that of the 0.25 pitch lens of the same $\sqrt{A}$ value, it is slightly inferior to that of the 0.25 pitch lens with reduced $\sqrt{A}$. The decision as to whether to use a reduced pitch or a reduced $\sqrt{A}$ value will depend on both magnitude of useful optical separation required and degree to which a more prolonged manufacturing process can be tolerated.

Figure 10:
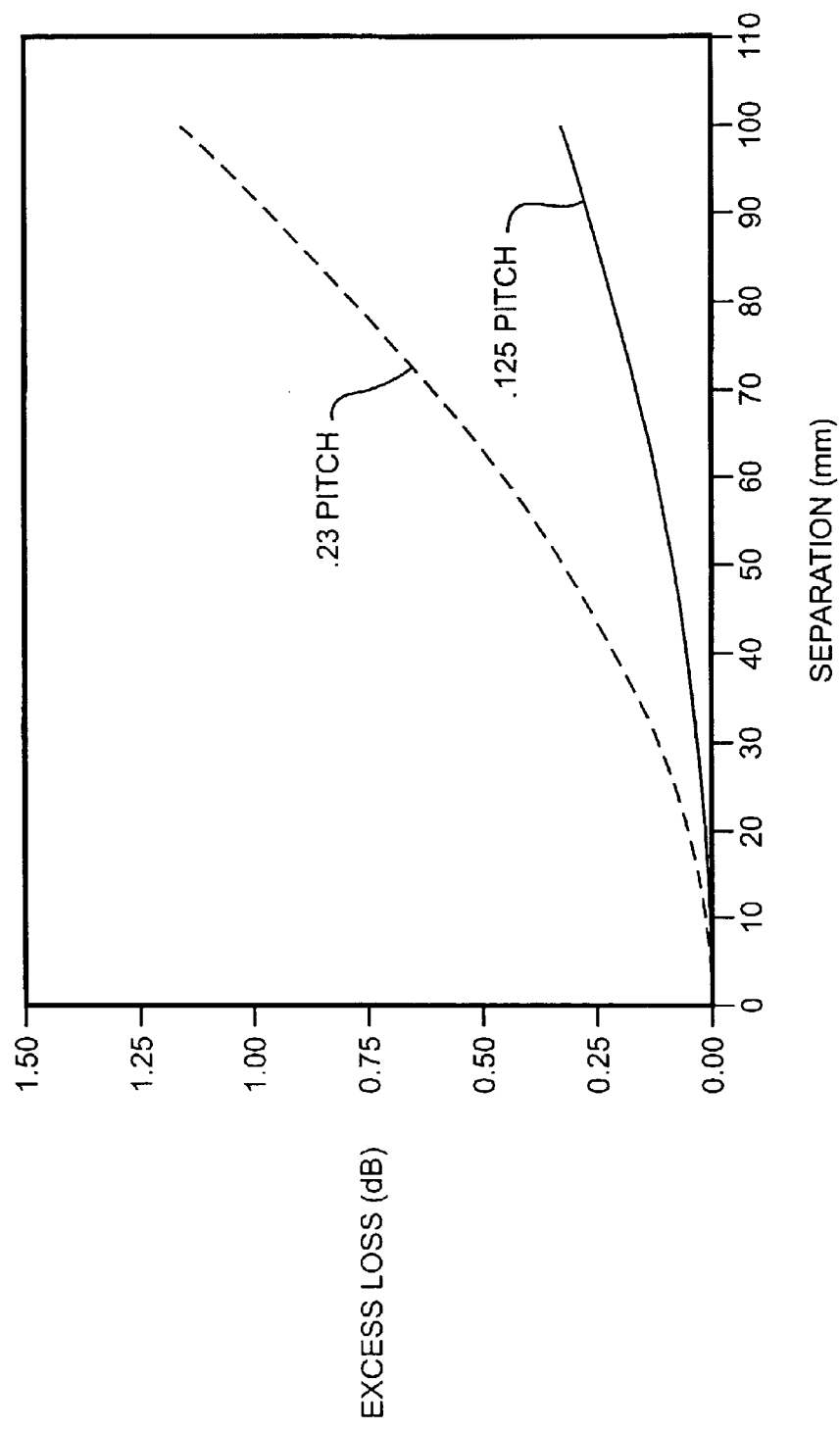
FIG. 10 is a graph showing the calculated excess loss for a collimator pair of 0.23 or 0.125 pitch lenses as a function of separation.

FIG. 10 shows the calculated excess loss for a collimator pair of 0.23-pitch and 0.125-pitch lenses as a function of separation. The calculation assumes that the collimators are designed to produce minimum loss at zero separation. Clearly, the distance over which the collimators can be separated while maintaining acceptable loss is greater for the smaller pitch lenses.

Figure 11:
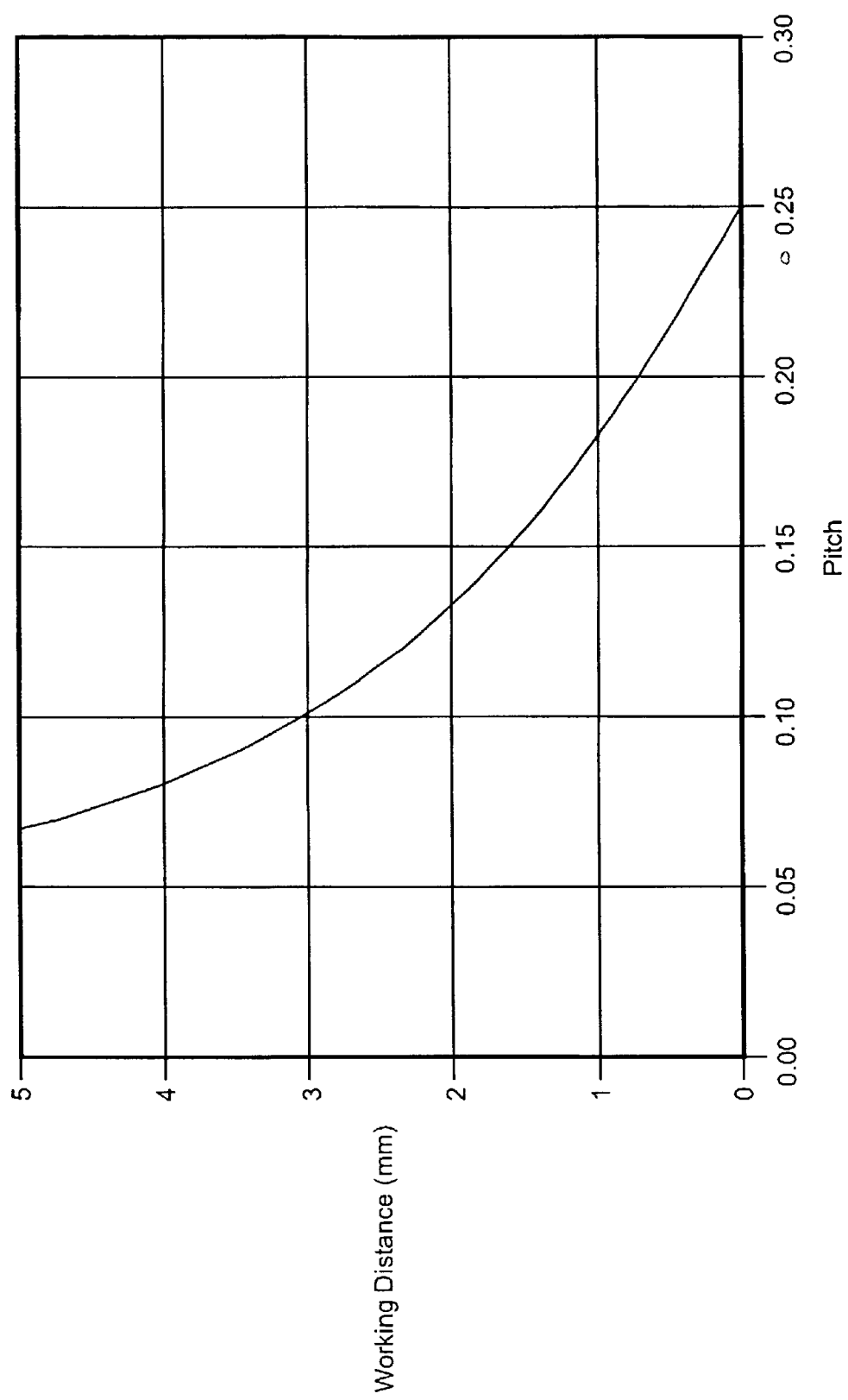
FIG. 11 is a graph of working distance versus pitch for a lens having a core refractive index of 1.535 and an index gradient of 0.295 mm$^{-1}$.

Another consideration is that as the fiber-lens distance increases, the size spot incident on the lens from the fiber increases. This must be smaller than about ½ the lens diameter for all of the light to be captured. For a 1.8 mm lens, as shown in FIG. 6 this distance must be less than about 4 mm. In FIG. 11 the working distances for lenses of $n_o$=1.535, $\sqrt{A}$=1.535 are shown as a function of pitch. If working distances less than about 4 mm are required, the lens pitch is restricted to values greater than about 0.08.

Figure 12:
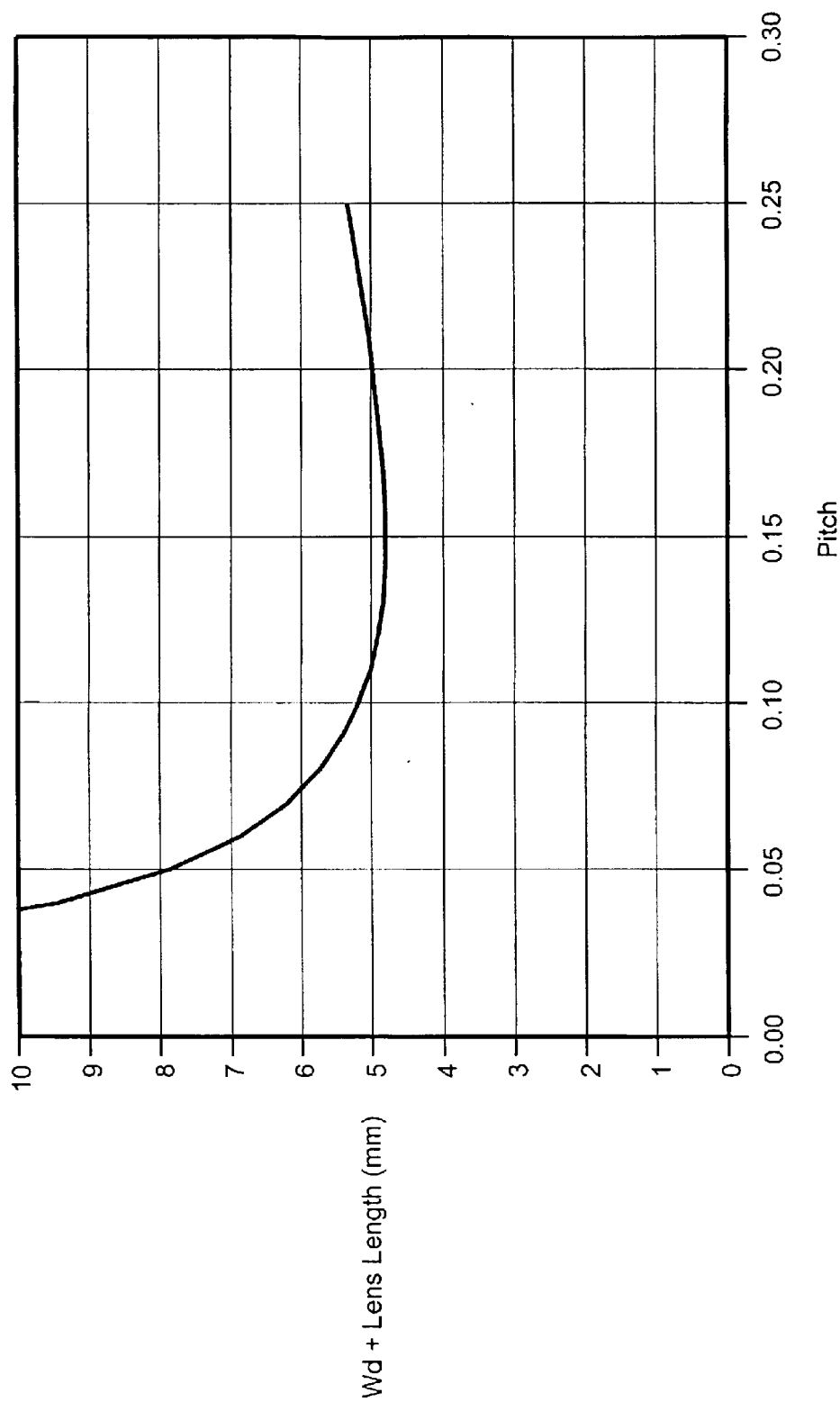
FIG. 12 is a graph of the sum of working distance and length versus pitch for a lens having a core refractive index of 1.535 and an index gradient of 0.295 mm$^{-1}$.

Referring now to FIG. 12, as in the discussion above with respect to smaller diameter GRIN lenses, the sum of working distance plus lens length varies only slowly in the pitch range of interest, so the size of the finished collimator does not become excessive. This is demonstrated in FIG. 12.

According to some embodiments of the present invention, smaller pitch lenses may be made directly from cane drawn to the desired final outside diameter. This process avoids extra processing step of grinding and polishing the outside diameter of the finished lenses. According to some embodiments, the same glass and ion exchange process may be used for many products, with the beam diameter being adjusted for various applications by varying the pitch length by grinding the lenses to different lengths. The lenses are physically shorter than the larger pitch lenses that are typically in the range of about 0.23–0.25 and higher. Therefore, more lenses may be made for each quantity of glass produced and cane processed, lowering manufacturing costs of the lenses and devices using such lenses. However, for some applications it may be necessary to reduce $\sqrt{A}$ by a prolonged ion exchange and/or heat treatment to produce the longest possible useful optical separations. In this case, these manufacturing advantages are not operative.

It will be apparent to those skilled in the art that various modifications and variations can be made to the present invention without departing from the spirit or scope of the invention. For example, while several of the figures show the optical performance of lenses at 1550 nm wavelengths, it will be understood that the invention is not limited to a particular operating wavelength and other wavelengths are within the scope of the invention. Thus, it is intended that the present invention covers modifications and variations of this invention provided they come within the scope of the appended claims and their equivalents.

What is claimed is:

1. A graded index lens comprising a generally cylindrical glass member having a radially varying index of refraction, the glass member having a length such that the lens has a pitch of less than about 0.23.

2. The graded index lens of claim 1, wherein the glass member exhibits a diameter of less than or equal to about 1 mm.

3. The graded index lens of claim 2, wherein the lens is operative to produce a beam having a mode field diameter between about 350 microns and 450 microns when illuminated with a beam having a mode field diameter of about 10.4 microns.

4. The graded index lens of claim 1, wherein the diameter of the lens is between about 1.5 mm and 2 mm.

5. The graded index lens of claim 4, wherein the lens is operative to produce a beam having a mode field diameter exceeding about 500 microns when illuminated with a beam having a mode field diameter of about 10.4 microns.

6. An optical device including a lens as claimed in claim 3.

7. An optical device including a lens as claimed in claim 5.

8. A method of making a graded index lens comprising obtaining a generally cylindrical glass member having a radially varying index of refraction and forming the glass member having a length such that the lens has a pitch of less than 0.23.

9. The method of claim 8, wherein the diameter of the cylindrical member exhibits a diameter of less than or equal to about 1 mm.

10. The method of claim 9, wherein the lens is operative to produce a beam having a mode field diameter of between about 350 microns and about 450 microns when illuminated with a beam having a mode field diameter of about 10.4 microns.

11. The method of claim 8, wherein the pitch of the lens is between about 0.23 and 0.10.

12. The method of claim 9, wherein the diameter of the cylindrical member is between about 1.5 mm and 2 mm.

13. The method of claim 12, wherein the lens is operative to produce a beam having a mode field diameter exceeding about 500 microns when illuminated with a beam having a mode field diameter of about 10.4 microns.

14. The method of claim 12, wherein the pitch of the lens is between about 0.23 and 0.10.

15. A collimator comprising an optical fiber and a generally cylindrical graded index lens in a spaced apart relationship, wherein the lens has a pitch less than about 0.23.

16. The collimator of claim 15, wherein for a lens having a diameter of about 1.8 mm and a pitch greater than about 0.10 the working distance between the lens and the fiber is less than about 4 mm.

17. The collimator of claim 15, wherein for a lens having a diameter less than about 1 mm and a pitch greater than about 0.10, the working distance between the fiber and the lens is less than about 2.5 mm.

18. The collimator of claim 15, wherein for a lens having a diameter less than about 0.8 mm and a pitch greater than about 0.10, the working distance between the fiber and the lens is less than about 2.0 mm.

19. A graded index lens comprising a generally cylindrical glass member having a radially varying index of refraction, a pitch between about 0.23 and 0.25 and an index gradient less than or equal to about 0.3 $mm^{-1}$.

20. The graded index lens of claim 19, wherein the diameter of the lens is between about 1.5 and 2.0 mm.

21. A graded index lens comprising a generally cylindrical glass member having a diameter less than or equal to 1.2 mm and a radially varying index of refraction, a pitch between about 0.23 and 0.25 and an index gradient greater than 0.36.

22. The graded index lens of claim 21, wherein the index gradient is between about 0.4 and 0.5.

23. The graded index lens of claim 21, wherein the index gradient is between about 0.48 and 0.50.

* * * * *